United States Patent
Nakagomi et al.

(10) Patent No.: US 8,278,917 B2
(45) Date of Patent: Oct. 2, 2012

(54) MAGNETIC HEAD INSPECTION METHOD AND MAGNETIC HEAD INSPECTION DEVICE

(75) Inventors: Tsuneo Nakagomi, Kanagawa Pref. (JP); Teruaki Tokutomi, Kanagawa Pref. (JP)

(73) Assignee: Hitachi High-Technologies Corporation, Tokyo (JP)

( * ) Notice: Subject to any disclaimer, the term of this patent is extended or adjusted under 35 U.S.C. 154(b) by 699 days.

(21) Appl. No.: 12/394,041

(22) Filed: Feb. 27, 2009

(65) Prior Publication Data
US 2010/0061002 A1 Mar. 11, 2010

(30) Foreign Application Priority Data

Feb. 28, 2008 (JP) .................. 2008-048349
Oct. 10, 2008 (JP) .................. 2008-263746

(51) Int. Cl.
G01R 33/12 (2006.01)
(52) U.S. Cl. ....................................... 324/210
(58) Field of Classification Search ........... 324/210–212
See application file for complete search history.

(56) References Cited

U.S. PATENT DOCUMENTS

| 6,879,152 B2 * | 4/2005 | Shimakura et al. ........... 324/244 |
| 2004/0010391 A1 * | 1/2004 | Cheng-I Fang et al. ...... 702/155 |
| 2007/0098246 A1 * | 5/2007 | Miyatake et al. ............. 382/141 |

FOREIGN PATENT DOCUMENTS

JP 2003-248911 9/2003

* cited by examiner

*Primary Examiner* — Jay Patidar
(74) *Attorney, Agent, or Firm* — Jianq Chyun IP Office

(57) ABSTRACT

A magnetic head inspection device inspects the write track width of a thin film magnetic head in a phase as early as possible during the manufacturing process. A recording signal (excitation signal) is input from bonding pads to the thin film magnetic head in a rowbar, and the magnetic field generated by the write pole (element) included in the thin film magnetic head is observed directly by using a magnetic force microscope (MFM), a scanning Hall probe microscope (SHPM), or a scanning magneto resistance effect microscope (SMRM) that performs a scanning motion at a position equivalent to the flying height of the magnetic head. In this manner, a shape of the generated magnetic field instead of the physical shape of the write pole (element) is measured; thus, a non-destructive inspection can be performed on the effective magnetic track width.

5 Claims, 5 Drawing Sheets

MAGNETIC HEAD INSPECTION METHOD AND MAGNETIC HEAD INSPECTION DEVICE

CROSS REFERENCE TO RELATED APPLICATION

The present application claims priority from Japanese applications No. 2008-048349 filed on Feb. 28, 2008, and No. 2008-263746 filed on Oct. 10, 2008, the contents of which are incorporated herein by reference.

BACKGROUND OF THE INVENTION

1. Field of the Invention

The present invention generally relates to a magnetic head inspection method and a magnetic head inspection device for inspecting a thin film magnetic head as well as a magnetic head manufacturing method, in particular, to a magnetic head inspection method and a magnetic head inspection device capable of inspecting the track width of a thin film magnetic head that cannot be inspected by an optical microscope as well as a magnetic head manufacturing method.

2. Description of Related Art

In recent years, with the rapid increase of surface recording density of the hard disk drive (HDD), the write track width of a thin film magnetic head becomes miniaturized, and thus the importance of the technology of accurately inspecting a write track width written onto a magnetic disk by using a write pole (element) included in the thin film magnetic head continues to increase.

In the past, an optical microscope was employed to measure the shape of the write pole (element) included in the thin film magnetic head. However, with the miniaturization of the track width, the write track width reaches an optical system resolution limit or is narrower than the optical system resolution. Thus, it is difficult to use the optical microscope to measure the shape of the write pole (element). As a result, a scanning electron microscope (SEM) has been recently adopted to replace the optical microscope for measuring the shape of the write pole (element). However, the measurement performed by using the SEM is a kind of destructive inspection. Moreover, similar to the optical microscope, the SEM only measures the physical shape of the write pole (element), which results in the following problem. That is, it is difficult to measure the correlation with the effective magnetic track width (write track width) actually written onto the magnetic disk. In addition, even if the technology of using an atomic force microscope (AFM) to measure the shape of the write pole (element) is adopted, the same problem as described above may also exist. Recently, Japanese Patent Laid-Open Publication No. 2003-248911 has disclosed a magnetic head measuring device. The magnetic head measuring device is formed in a manner that the magnetic field characteristics, i.e., the magnetic field saturation phenomenon, of a write pole may be observed visually by using a magnetic force microscope (MFM).

When the shape of the magnetic head (write pole) is measured by using the SEM or AFM as in the past, though the physical shape of the write pole (element) can be measured, the effective magnetic track width (write track width) actually written onto the magnetic disk cannot be measured. Therefore, in the past, a head disk dedicated measuring device called a spin stand is employed to inspect the write track width in a state after the magnetic head is integrated with a suspension (i.e., a head-gimbal assembly (HGA) state) or in a simulated HGA state.

However, if the inspection with the spin stand is not performed in a final process of magnetic head manufacturing in an HGA state or a simulated HGA state, the inspection of the write track width cannot be implemented. Thus, the inspection with the spin stand is not ideal for improving the productivity or dealing with the requirement for an early feedback in the manufacturing process.

SUMMARY OF THE INVENTION

Accordingly, the present invention is directed to a magnetic head inspection method and a device capable of inspecting the write track width of a magnetic head in a phase as early as possible during the manufacturing process.

A first feature of a magnetic head inspection method of the present invention lies in that, characteristics of a magnetic head in a rowbar shape sliced from a wafer are inspected. In a state that the write pole portion of a magnetic head is provided with an excitation signal, the magnetic probe of a cantilever means of an MFM performs a scanning motion along the surface of the write pole portion of the magnetic head at a position with a distance from the recording portion of the magnetic head equivalent to the flying height of the magnetic head relative to a magnetic disk, detects a signal representing an oscillation state of the cantilever means, and measures an effective track width of the magnetic head according to the signal. In the magnetic head inspection method of the present invention, a recording signal (excitation signal) is input from bonding pads to the thin film magnetic head in the rowbar, and a magnetic field generated by the write pole (element) included in the thin film magnetic head is observed directly by using the MFM that performs the scanning motion at the position with the distance equivalent to the flying height of the magnetic head. In this manner, a shape of the generated magnetic field instead of the physical shape of the write pole (element) is measured, and thus a non-destructive inspection is performed on the effective magnetic track width.

A second feature of a magnetic head inspection method of the present invention lies in that, characteristics of a magnetic head in a rowbar shape sliced from a wafer are inspected. In a state that the write pole portion of a magnetic head is provided with an excitation signal, a Hall element or a magneto resistance (MR) element disposed on a cantilever means of an AFM performs a scanning motion along the surface of the write pole portion of the magnetic head while being maintained at a position with a distance from the recording portion of the magnetic head equivalent to the flying height of the magnetic head relative to a magnetic disk, detects a signal from the Hall element or the MR element, and measures the effective track width of the magnetic head according to the signal. In the magnetic head inspection method of the present invention, a write signal (excitation signal) is input from bonding pads to the thin film magnetic head in a rowbar shape, and the magnetic field generated by the write pole (element) included in the thin film magnetic head is observed directly by using the Hall element or the MR element disposed on the cantilever means of the MFM that performs the scanning motion at the distance equivalent to the flying height of the magnetic head. In this manner, the shape of the generated magnetic field instead of the physical shape of the write pole (element) is measured, and thus a non-destructive inspection is performed on the effective magnetic track width.

A third feature of the magnetic head inspection method of the present invention lies in that, in the situation that a magnetic head in a rowbar shape is sliced from a wafer, the effective track width of the magnetic head in a rowbar shape is measured by using an MFM, a scanning Hall probe microscope (SHPM), or a scanning magneto resistance effect microscope (SMRM). In the present invention, the effective track width that used to be inspected by using a spin stand only in an HGA state or a simulated HGA state, can hereby be measured with the MFM, the SHPM, or the SMRM in a rowbar shape.

A first feature of the magnetic head inspection device of the present invention lies in that, the magnetic head inspection device inspects characteristics of a magnetic head in a rowbar shape sliced from a wafer. The device includes: a cantilever means, provided with a magnetic probe at the front end thereof and oscillated at a specific frequency; a probe means, in contact with connecting terminals of head sliders on the rowbar, for providing an excitation signal to the write pole of a magnetic head; a scanning means, for enabling the magnetic probe to perform a scanning motion along the recording portion of the magnetic head provided with the excitation signal at a position with a distance from surface of the write pole equivalent to the flying height of the magnetic head relative to a magnetic disk; a detection means, for detecting the oscillation state of the cantilever means during the scanning by the scanning means; and a computing means, for calculating the effective track width of the magnetic head according to a signal representing the oscillation state of the cantilever means detected by the detection means. The magnetic head inspection device of the present invention is provided for realizing the first or third feature of the magnetic head inspection method.

A second feature of a magnetic head inspection device of the present invention lies in that, the magnetic head inspection device inspects characteristics of a magnetic head in a rowbar shape sliced from a wafer. The device includes: a cantilever means of an AFM, oscillated at a specific frequency; a magnetic field detection means, formed by a Hall element or an MR element disposed on the cantilever means; a probe means, in contact with connecting terminals of head sliders in the rowbar shape, for providing an excitation signal to the write pole of the magnetic head; a scanning means, for enabling the magnetic field detection means to perform a scanning motion along the recording portion of the magnetic head provided with the excitation signal while being maintained at a position with a distance from the recording portion of the write pole equivalent to the flying height of the magnetic head relative to a magnetic disk; a detection means, for detecting changes in the signal output from the magnetic field detection means during the scanning of the scanning means; and a computing means, for calculating the effective track width of the magnetic head according to the signal changes detected by the detection means. The magnetic head inspection device of the present invention is provided for realizing the second or third feature of the magnetic head inspection method.

A magnetic head manufacturing method of the present invention is characterized in that, a magnetic head is manufactured by using the magnetic head inspection method disclosed in the first, second, or third feature or the magnetic head inspection device disclosed in the first or second feature. The magnetic head is manufactured by using either the magnetic head inspection method or the magnetic head inspection device.

The present invention has the effect of inspecting the write track width of the magnetic head in a phase as early as possible during the manufacturing process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2(A) and 2(B) are schematic views illustrating an inspection of the magnetic head inspection device in FIG. 1, wherein FIG. 2(A) is a schematic view of a constitution of a magnetic head portion, and FIG. 2(B) is a view illustrating an example of a displacement signal of a cantilever portion.

DESCRIPTION OF THE EMBODIMENTS

Figure 1:
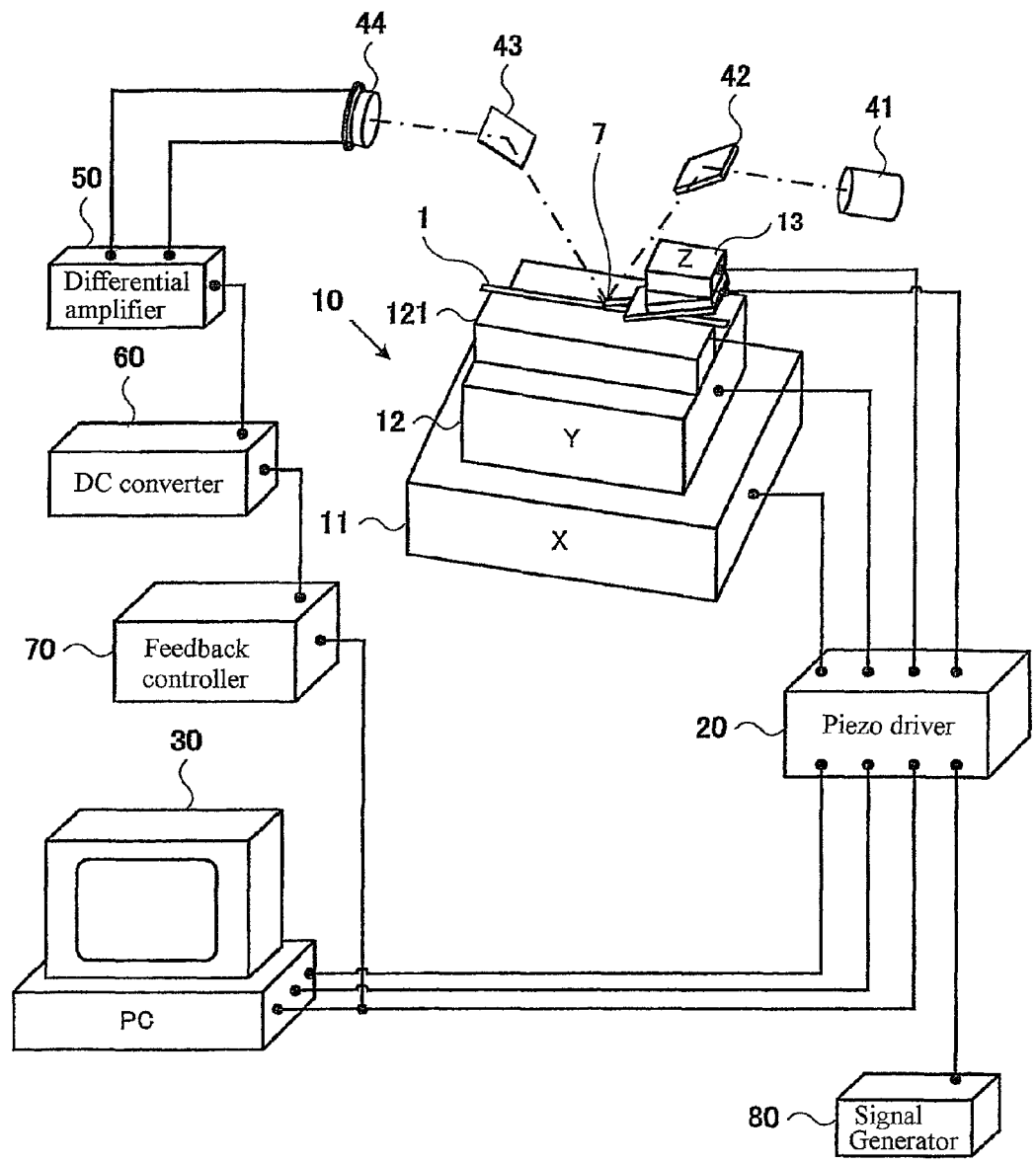
FIG. 1 is a schematic of a magnetic head inspection device in one aspect of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic illustrating the composition of a magnetic head inspection device in one aspect of the present invention. In the magnetic head inspection device in FIG. 1, the effective track width of an MR magnetic head, a giant magneto resistive (GMR) magnetic head, a tunneling magneto resistive (TMR) magnetic head, and the like (referred to as an MR magnetic head below) can be measured in a rowbar state (a block formed by an arrangement of head sliders in block form) prior to the dicing process where the rowbar is separated into individual sliders (or chips).

Generally, the rowbar is a long and thin block of around 3 cm to 5 cm sliced from a wafer. One rowbar is composed of around 40 to 60 head sliders. In this embodiment of the magnetic head inspection device, the prescribed inspection is performed on the rowbar 1 as a work piece. Generally, the rowbars are provided in a tray with around 20 to 30 rowbars 1 are arranged side by side at a fixed spacing in the direction of the minor axis. A handling robot (not shown) extracts the rowbars 1 one by one from the tray (not shown) and transports the rowbars onto an inspection stage 10. The rowbar 1 that has been transported and placed on the inspection stage 10 is inspected in the following manner.

The inspection stage 10 is formed by an X stage 11 and a Y stage 12 capable of enabling the rowbar 1 to move in X and Y directions. The rowbar 1 is positioned by making preliminary contact of a single side surface in the direction of the major axis therefore and the reference surface of the Y stage 12. A carrier portion 121 for scanning the rowbar 1 is located on top of the Y stage 12. A stepped portion approximately coinciding with the rowbar 1 in shape is located at one side on the upper edge of the carrier portion 121. The rowbar 1 is placed in position by pressing against each of the bottom surface and side surface of the stepped portion. The rear surface (opposite to that having connecting terminals for the magnetic head) of the rowbar 1 is pressed against the back surface of the stepped portion. The stepped portion has reference surfaces that are each parallel to or orthogonal to the moving direction of the X stage 11 (X axis) and the moving direction of the Z stage 13 (Z axis). Therefore, the rowbar 1 may be accurately positioned in the X and Z directions by placing the rowbar 1 against the bottom surface and the side surface of the stepped portion of the carrier portion 121.

Although not shown, a camera for measuring position offset is located above the Y stage 12. The Z stage 13 moves the cantilever portion 7 of the MFM in the Z direction. The X stage 11, the Y stage 12, and the Z stage 13 of the inspection stage 10 are each composed of piezo stages. When the positioning is finished, suction holds the rowbar 1 on the carrier portion 121, and the front of a probe card (not shown) contacts the terminals at the front surface of the rowbar 1. Thereby, the write pole of a magnetic head in the rowbar 1 can be energized through its recording head coil.

A piezo driver 20 performs drive control of the X stage 11, the Y stage 12, and the Z stage 13 (the piezo stages) of the inspection stage 10. The control portion 30 comprising of a control computer that takes the form of a personal computer (PC) including a monitor as its basic configuration. As shown in the figure, the cantilever portion 7 having a sharp magnetic probe at its free end is located at a position above and pointing towards the rowbar 1 carried on the Y stage 12 of the inspection stage 10. The cantilever portion 7 is installed on an oscillator mounted below the Z stage 13. The oscillator comprising of a piezo element with an alternating current (AC) voltage applied at a frequency close to its mechanical resonance frequency via the piezo driver 20, that causes it to vibrate the magnetic probe up and down.

A displacement detection portion comprising of a semiconductor laser element 41, reflecting mirrors 42 and 43, and a displacement sensor 44. The displacement sensor 44 comprising of a dual-photo detector element. Light emitted from the semiconductor laser element 41 impinges onto the cantilever portion 7 after being deflected there by the reflecting mirror 42. Light reflected by the cantilever portion 7 is directed into the displacement sensor 44 by the reflecting mirror 43. A differential amplifier 50 implements a specific operation on the differential signal of the two signals output from the displacement sensor 44, and outputs its signal to a direct current (DC) converter 60. That is, the differential amplifier 50 outputs a displacement signal corresponding to a difference between the two signals output from the displacement sensor 44 to the DC converter 60. The DC converter 60 comprising of a root mean squared value to direct current (RMS-DC) converter that converts the displacement signal output from the differential amplifier 50 into an effective DC signal value.

The displacement signal output from the differential amplifier 50 is a signal corresponding to a displacement of the cantilever portion 7. Due to the oscillation of the cantilever portion 7, the displacement signal becomes an AC signal. The signal output from the DC converter 60 is output to a feedback controller 70. The feedback controller 70 outputs the signal output from the DC converter 60 as a signal for monitoring the amplitude of oscillation of the cantilever portion 7 to the control portion 30, and outputs the signal output from the DC converter 60 as a control signal for the Z stage 13 for adjusting the amplitude of oscillation of the cantilever portion 7 to the piezo driver 20. The control portion 30 monitors the signal and controls the Z stage 13 of the piezo driver 20 according to a value of the signal, in order that an initial position of the cantilever portion 7 can be adjusted before the measurement starts. In this aspect, the magnetic head flying height of an HDD is set as the initial position of the cantilever portion 7. A signal generator 80 provides an oscillating signal for oscillation of the cantilever portion 7 via the piezo driver 20. The piezo driver 20 vibrates the cantilever portion 7 at the frequency of the oscillating signal from the signal generator 80.

Figures 2A, 2B:
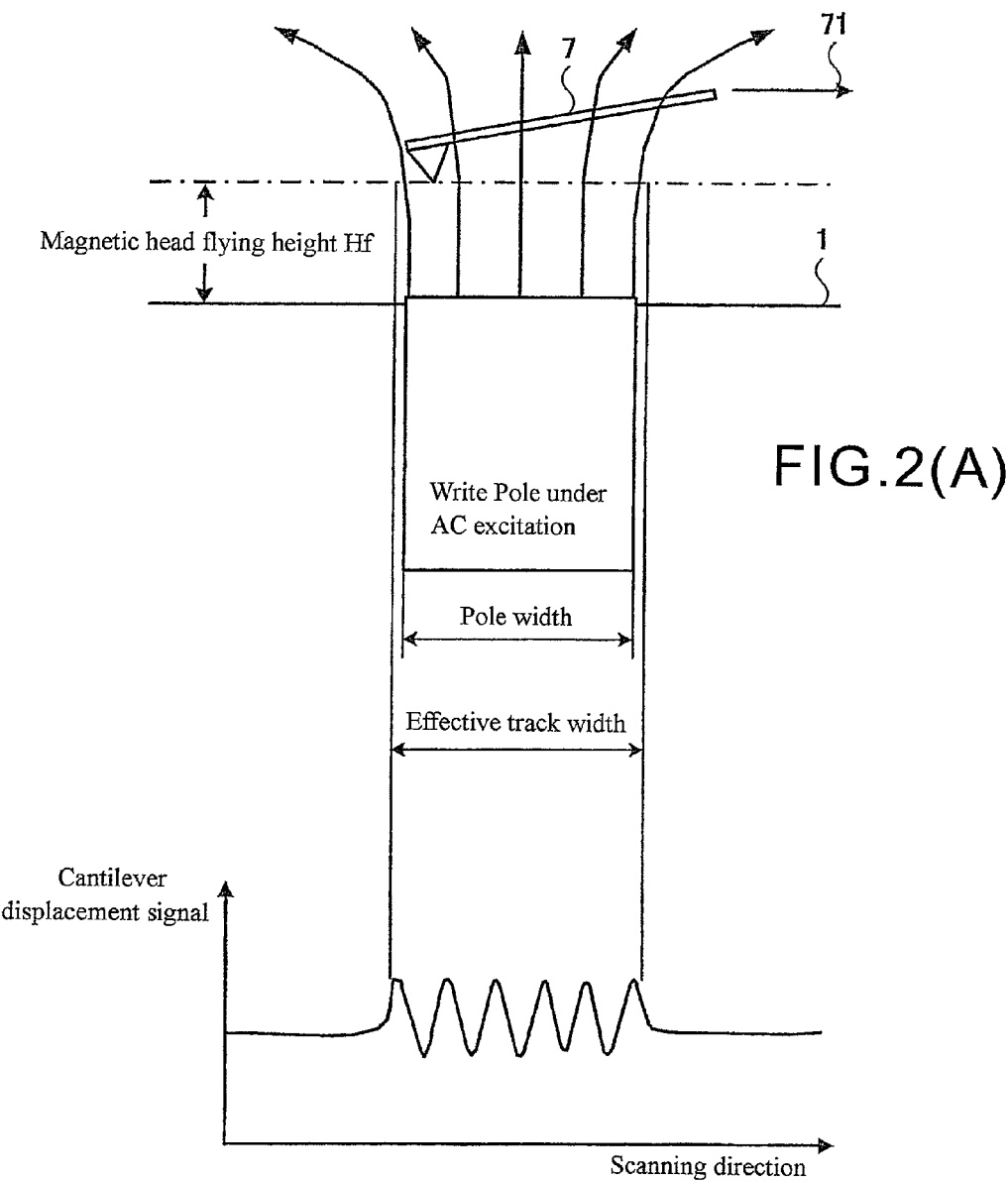

FIGS. 2(A) and 2(B) are schematic views illustrating an inspection manner of the magnetic head inspection device in FIG. 1, wherein FIG. 2(A) is a view illustrating an enlarged construction of a magnetic head portion, and FIG. 2(B) is a view illustrating an example of a displacement signal of the cantilever portion. As shown in FIGS. 1 and 2(A), the cantilever portion 7 is positioned by the Z stage 13, such that the front end portion of the magnetic probe of the cantilever portion 7 is at a height from the surface of a magnetic head in the rowbar 1 equivalent to the magnetic head flying height Hf. The cantilever portion 7 performs a scanning motion in the scanning direction 71 relative to the rowbar 1 (magnetic head). In this aspect, the rowbar 1 moves via the X stage 11 and the Y stage 12.

At this point, the write pole of the magnetic head is undergoing an AC excitation, and thus the cantilever portion 7 is displaced synchronously with the AC excitation. The displacement of the cantilever portion 7 is shown by the displacement signal in FIG. 2(B), and thus an effective track width of the magnetic head can be detected from the displacement signal. Furthermore, the actual pole width of the magnetic head may be measured by performing a normal inspection with the MFM instead of with the AC excitation on the write pole.

In this way, for a conventional MFM, although the actual pole width of the magnetic head can be detected, the effective track width of the write pole of the magnetic head can also be inspected through the AC excitation performed on the write pole of the magnetic head while at the same time through the scanning motion performed by the cantilever portion 7 at a flying height of the magnetic head, thereby achieving inspection of the write track width of the magnetic head in the earliest possible phase of the manufacturing process, as shown in this implementation aspect.

Figure 3:
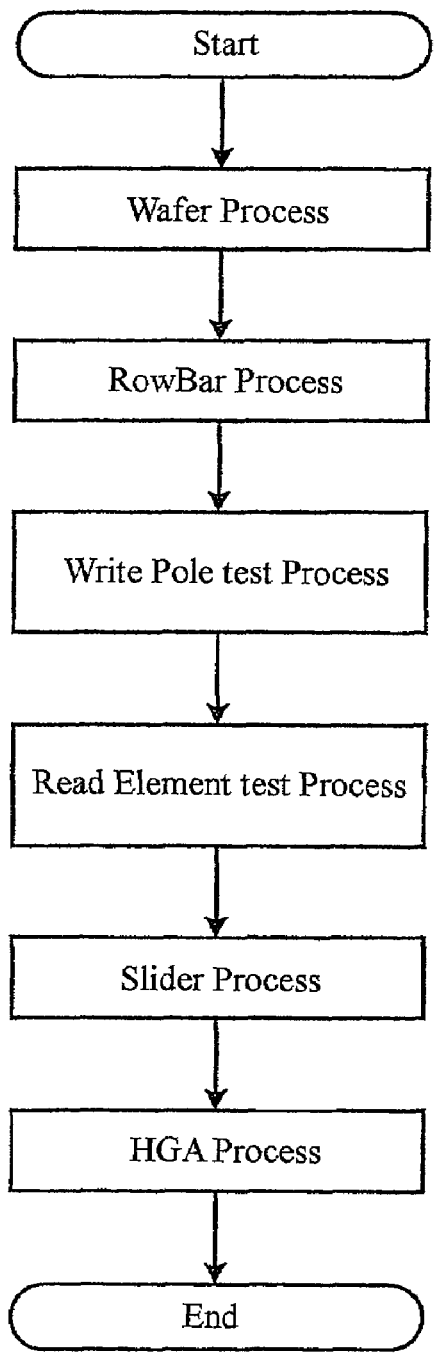
FIG. 3 is a chart illustrating an example of a magnetic head manufacturing process including an inspection process of a write pole using an MFM of the present invention.

FIG. 3 is a flow chart illustrating an example of a magnetic head manufacturing process including an inspection process of the write pole using an MFM of the present invention. Referring to the figure, in the wafer process, film deposition, etching, cleaning, and other semiconductor like processes are performed. In the rowbar process, a bar-shaped rowbar is sliced from a wafer, and lapping, air bearing surface (ABS) formation, cleaning, carbon protective film deposition, and other processes are performed on the rowbar. In the write pole test process, the effective track width of the write pole is measured for the bar-shaped rowbar using the MFM in FIG. 1. In the read element test process, similarly, electromagnetic conversion characteristics of each read element are measured within the bar-shaped rowbar. In the slider process, the bar-shaped rowbar is divided up (diced) and each slider is machined into a chip shape, a cleaning and an inspection process are performed. In the HGA process, a magnetic head slider already machined into the chip shape is connected to a suspension, and a cleaning process and an inspection process are performed. Afterwards, the HDD processes (head stack assembly (HSA) process and head disk assembly (HDA) process) (not shown) are performed. According to this embodiment, a good-or-bad determination may be performed on the effective track width of the write pole in the rowbar shape, thereby improving the productivity and enabling early feedback on previous processes.

Figure 4:
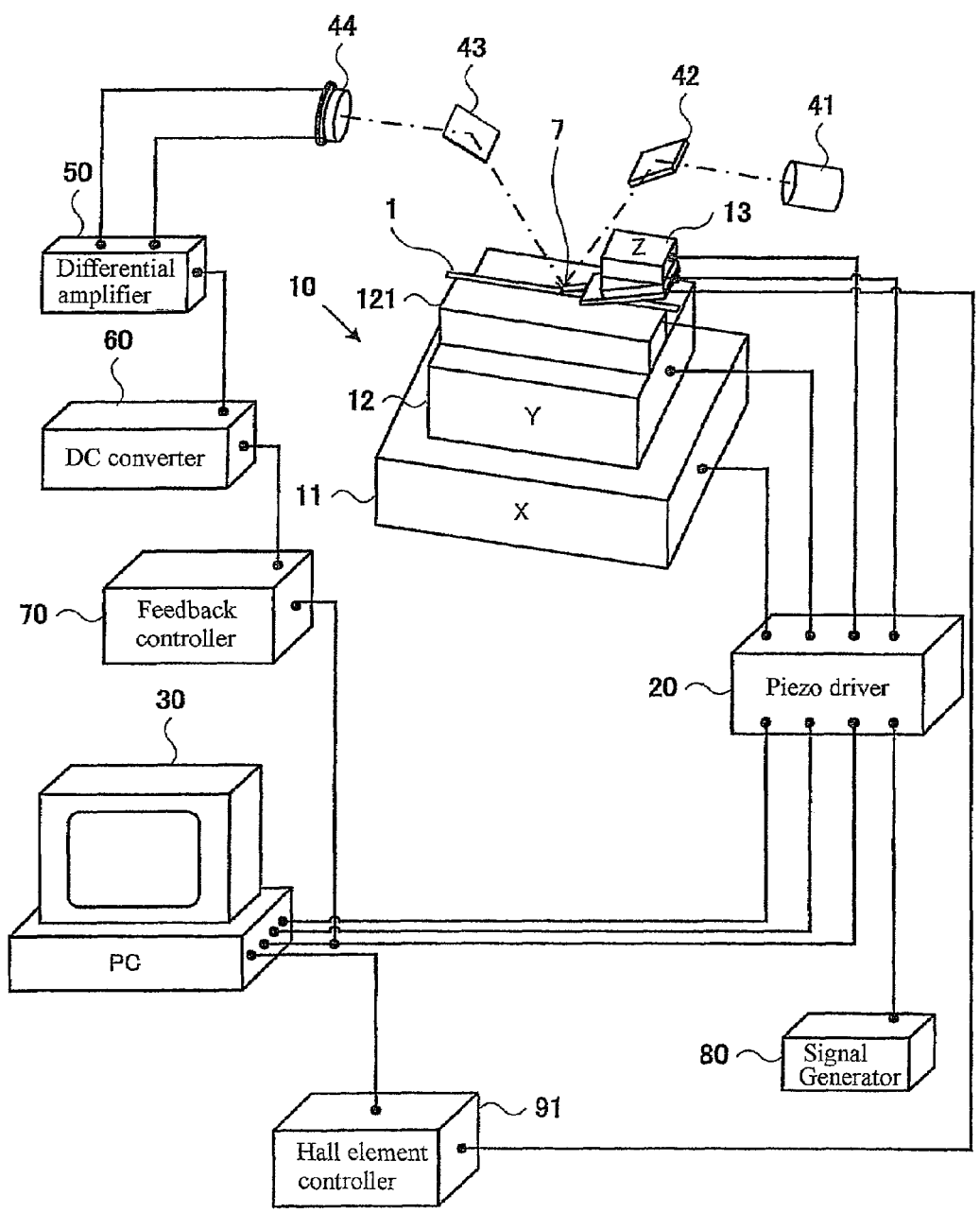
FIG. 4 is a schematic of a magnetic head inspection device in another aspect of the present invention.
Figure 5:
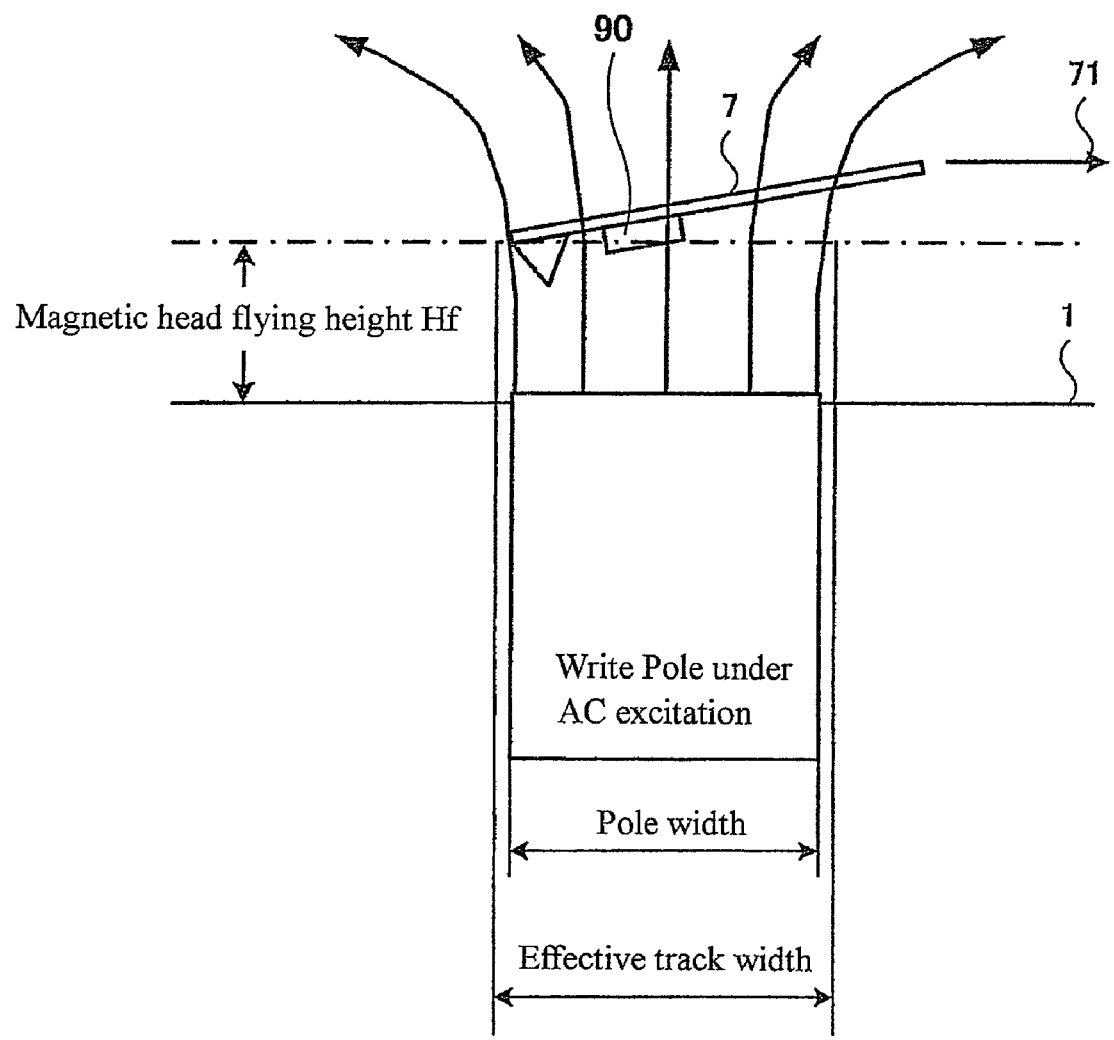
FIG. 5 is a schematic illustrating the inspection method of the magnetic head inspection device in FIG. 4 and is a schematic view illustrating an enlarged construction of a magnetic head portion.

FIG. 4 is a schematic view illustrating the construction of another embodiment of a magnetic head inspection device in an implementation aspect of the present invention. In FIG. 4, like symbols are used to indicate parts having the same constitution as those in FIG. 1, and thus descriptions thereof are omitted. FIG. 5 is a schematic view illustrating an inspection manner of the magnetic head inspection device in FIG. 4 and is a schematic view illustrating an enlarged construction of a magnetic head portion. The difference between the magnetic head inspection device in FIGS. 4 and 5 and that in FIGS. 1 and 2 lies in that, a Hall element 90 is mounted on the cantilever portion 7, and the shape of the magnetic field (an absolute value of the magnetic field) generated by the magnetic head is directly measured, so that an effective magnetic track width can be measured. That is, the magnetic head inspection device in FIG. 4 is characterized in an SHPM (Scanning Hall Probe Microscope) that makes the Hall element 90 infinitely close to the magnetic material to be observed so as to detect and visualize the magnetic field. The Hall element 90 is formed by patterning a GaAs/AlGaAs epitaxial wafer through photolithography. A Hall element controller 91 provides a current to terminals of the Hall element 90. The Hall element controller 91 adopts a nanovolt meter or other meters to measure the Hall voltage generated between the other terminals of the Hall element 90, and outputs the measured Hall voltage to the control portion 30. A PC of the control portion 30 makes a two-dimensional distribution of surface magnetic field emission according to the Hall voltage, and measures the effective track width of the magnetic head according to the two-dimensional distribution.

Instead of the Hall element 90 being installed on the cantilever portion 7 of the magnetic head inspection device in FIGS. 4 and 5, an MR sensor element may also be installed at the front end portion of the cantilever portion 7, so as to apply an SMRM (Scanning Magneto-Resistance Microscope) in the aforementioned magnetism measurement. At this point, an MR sensor controller may be used to replace the Hall element controller to cope with the above situation. In this manner, the Hall element or MR element can be installed on the cantilever portion 7 of the MFM, so that SHPM or SMRM is capable of implementing the shape measurement and magnetism measurement (measurement of the effective track width) of the write pole at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A magnetic head inspection method, for inspecting characteristics of a magnetic head in a rowbar shape sliced from a wafer, wherein
in a state that a write pole portion of the magnetic head is provided with an excitation signal, a magnetic probe of a cantilever means of a magnetic force microscope (MFM) performs a scanning motion along a surface of the write pole portion of the magnetic head while being maintained at a position with a distance from a recording portion of the magnetic head equivalent to a flying height of the magnetic head relative to a magnetic disk, and detects a signal representing an oscillation state of the cantilever means, and measures an effective track width of the magnetic head according to the signal.

2. A magnetic head inspection method, for inspecting characteristics of a magnetic head in a rowbar shape sliced from a wafer, wherein
in a state that a write pole portion of the magnetic head is provided with an excitation signal, a Hall element or a magneto resistance (MR) element mounted on a cantilever means of an atomic force microscope (AFM) performs a scanning motion along a surface of the write pole portion of the magnetic head while being maintained at a position with a distance from a recording portion of the magnetic head equivalent to a flying height of the magnetic head relative to a magnetic disk, and detects a signal from the Hall element or the MR element, and measures an effective track width of the magnetic head according to the signal.

3. The magnetic head inspection method as claimed in claim 2, wherein
in a state that a magnetic head in a rowbar shape is sliced from a wafer, an effective track width of the magnetic head in a rowbar shape is measured by using a scanning Hall probe microscope (SHPM), or a scanning magneto resistance effect microscope (SMRM).

4. A magnetic head inspection device, for inspecting characteristics of a magnetic head in a rowbar shape sliced from a wafer, comprising:
a cantilever means, provided with a magnetic probe at a front end thereof and oscillated at a specific frequency;
a probe means, in contact with connecting terminals of head sliders in the rowbar shape, for providing an excitation signal to a write pole of the magnetic head;
a scanning means, for enabling the magnetic probe to perform a scanning motion along a recording portion of the magnetic head provided with the excitation signal while being maintained at a position with a distance from the recording portion of the write pole equivalent to a flying height of the magnetic head relative to a magnetic disk;
a detection means, for detecting an oscillation state of the cantilever means during the scanning motion of the scanning means; and
a computing means, for calculating an effective track width of the magnetic head according to a signal representing the oscillation state of the cantilever means detected by the detection means.

5. A magnetic head inspection device, for inspecting characteristics of a magnetic head in a rowbar shape sliced from a wafer, comprising:
a cantilever means of an atomic force microscope (AFM), oscillated at a specific frequency;
a magnetic field detection means, comprised of a Hall element or a magneto resistance (MR) element mounted on the cantilever means;
a probe means, in contact with connecting terminals of head sliders in the rowbar shape, for providing an excitation signal to a write pole of the magnetic head;
a scanning means, for enabling the magnetic field detection means to perform a scanning motion along a recording portion of the magnetic head provided with the excitation signal while being maintained at a position with a distance from the recording portion of the write pole equivalent to a flying height of the magnetic head relative to a magnetic disk;
a detection means, for detecting a signal output from the magnetic field detection means during the scanning motion of the scanning means; and
a computing means, for calculating an effective track width of the magnetic head according to the signal detected by the detection means.

* * * * *